(12) United States Patent
Wu

(10) Patent No.: US 9,626,053 B2
(45) Date of Patent: *Apr. 18, 2017

(54) TOUCH CONTROL DISPLAY DEVICE AND JOINT TOUCH CONTROL DISPLAY

(71) Applicant: Ye Xin Technology Consulting Co., Ltd., Hsinchu (TW)

(72) Inventor: I-Wei Wu, Hsinchu (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 179 days.

This patent is subject to a terminal disclaimer.

(21) Appl. No.: 14/496,290

(22) Filed: Sep. 25, 2014

(65) Prior Publication Data

US 2015/0091833 A1  Apr. 2, 2015

(30) Foreign Application Priority Data

Sep. 27, 2013 (TW) .............................. 102135209 A

(51) Int. Cl.
| | |
|---|---|
| *G06F 3/041* | (2006.01) |
| *G06F 3/044* | (2006.01) |
| *G02F 1/1333* | (2006.01) |
| *G02F 1/1335* | (2006.01) |

(52) U.S. Cl.
CPC .......... *G06F 3/044* (2013.01); *G02F 1/13336* (2013.01); *G02F 1/133524* (2013.01); *G02F 2001/133562* (2013.01)

(58) Field of Classification Search
CPC .......... G02F 1/13336; G02F 1/133524; G02F 2001/133562; G06F 3/044
See application file for complete search history.

(56) References Cited

U.S. PATENT DOCUMENTS

| | | | |
|---|---|---|---|
| 8,780,015 B2 * | 7/2014 | Watanabe | ........... G02F 1/13336 345/1.3 |
| 9,182,542 B2 * | 11/2015 | Wu | .......................... G02B 6/10 |
| 2011/0025594 A1 | 2/2011 | Watanabe | |
| 2011/0080348 A1 * | 4/2011 | Lin | ....................... G06F 1/1626 345/173 |

(Continued)

FOREIGN PATENT DOCUMENTS

| | | |
|---|---|---|
| CN | 101965604 B | 12/2012 |
| JP | 07-128652 | 5/1995 |

*Primary Examiner* — Afroza Chowdhury
(74) *Attorney, Agent, or Firm* — Steven M. Reiss

(57) ABSTRACT

A touch control display device includes a display panel, an image compensation element positioned on the display panel, and a touch sensing structure adjacent to the image compensation element. The touch sensing structure is configured to sense touch actions applied to the touch control display device. The display panel includes a main display portion and a periphery display portion. The image compensation element includes a compensation portion, and the compensation portion is configured to distribute the image of the periphery display portion to the outside of the periphery display portion away from the main display portion. The compensation portion includes a light incident surface, a light emitting surface, and a plurality of light guiding channels extending from the light incident surface to the light emitting surface. An area of the light emitting surface is greater than an area of the light incident surface.

3 Claims, 24 Drawing Sheets

(56) References Cited

U.S. PATENT DOCUMENTS

| | | | | |
|---|---|---|---|---|
| 2011/0279487 A1* | 11/2011 | Imamura | ............... | G09G 3/3611 |
| | | | | 345/690 |
| 2013/0104082 A1* | 4/2013 | Burge | .................... | G06F 3/0482 |
| | | | | 715/841 |
| 2013/0328793 A1* | 12/2013 | Chowdhury | ............ | G06F 3/041 |
| | | | | 345/173 |
| 2014/0002371 A1* | 1/2014 | Allen | ....................... | G06F 3/041 |
| | | | | 345/173 |
| 2015/0092447 A1* | 4/2015 | Wu | ..................... | G02F 1/13336 |
| | | | | 362/616 |

* cited by examiner

TOUCH CONTROL DISPLAY DEVICE AND JOINT TOUCH CONTROL DISPLAY

FIELD

The subject matter herein generally relates to a touch control display device and a joint touch control display.

BACKGROUND

Touch control display devices are widely used in consumer electronic products. An increasing need is to provide a big display device for displaying an image having big size. Yet, the big display device is expensive. Thus, there is a need for providing a number of touch control display devices having limited sizes to cooperatively display the image having big size.

BRIEF DESCRIPTION OF THE DRAWINGS

Implementations of the present technology will now be described, by way of example only, with reference to the attached figures.

DETAILED DESCRIPTION

Figure 1:
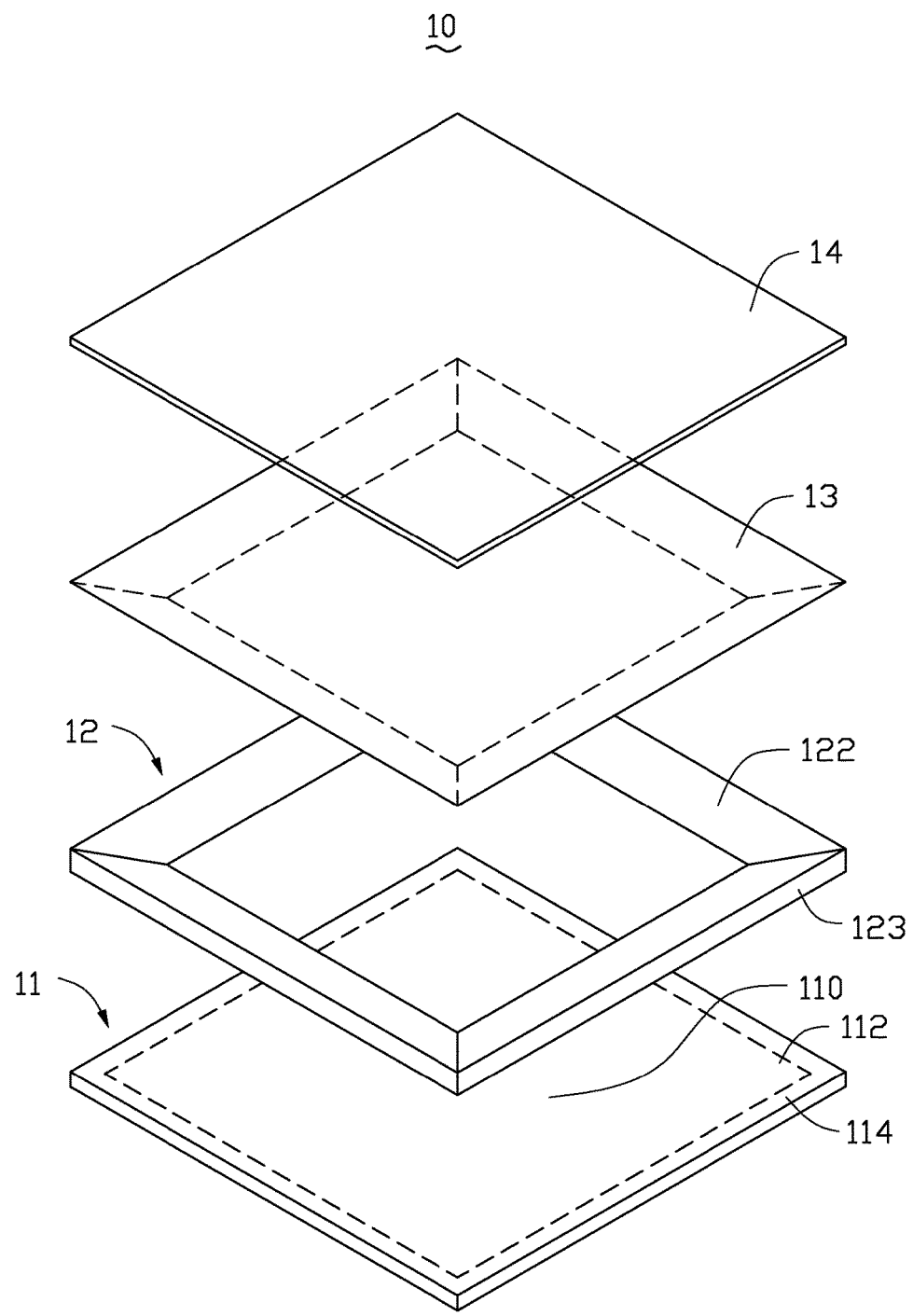
FIG. 1 is an isometric view of a touch control display device of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "outside" refers to a region that is beyond the outermost confines of a physical object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

FIG. 1 is an isometric view of a touch control display device of the present disclosure. The touch control display device 10 includes a display panel 11, an image compensation element 12, a transmission element 13, and a touch sensing structure 14. The display panel 11 may be, but is not limited to, a liquid crystal display panel, an organic electroluminescent display, a plasma display panel or an electrowetting display. It is understood that, for a display panel 11 consisting of a liquid crystal display panel, the touch control display device 10 may include a backlight module (not shown) for supplying light. The image compensation element 12 is disposed on the display panel 11. The transmission element 13 and the touch sensing structure 14 are disposed adjacent to the image compensation element 12 and both at the same side away from the display panel 11. More particularly, the transmission element 13 is disposed adjacent to the image compensation element 12, and the touch sensing structure 14 is disposed on the transmission element 13.

Figure 2:
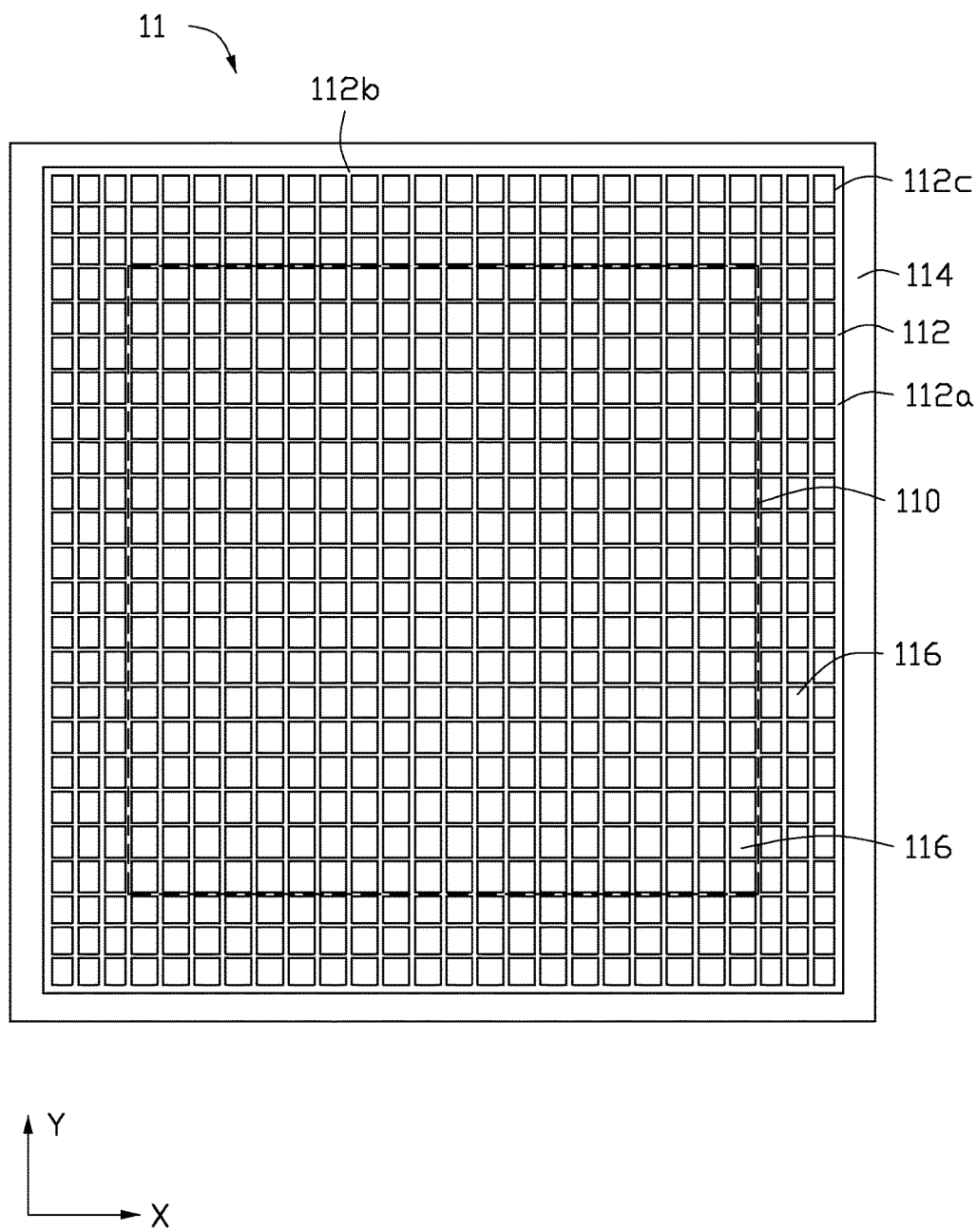
FIG. 2 is a plan view of the display panel of the touch control display device of FIG. 1.

The display panel 11 defines a main display region 110, a periphery display region 112 located at one side of the main display region 110, and a non-display region 114 located at one side of the periphery display region 112. The non-display region 114 can be a frame of the touch control display device 10 which displays no image. FIG. 2 is a plan view of the display panel 11 of the touch control display device 10 of FIG. 1. The main display region 110 and the periphery display region 112 both include a plurality of pixels 116. The pixels 116 of the main display region 110 and the periphery display region 112 are arranged as a matrix.

The pixels 116 in the main display region 110 are evenly arranged and are equal in size. A density of the pixels 116 in the main display region 110 (per unit area) is smaller than a density of the pixels 116 in the periphery display region 112. In detail, a space between adjacent pixels 116 in the main display region 110 is substantially bigger than or equal to a space between adjacent pixels 116 in the periphery display region 112. Preferably, the space between adjacent pixels 116 in the main display region 110 is substantially bigger than the space between adjacent pixels 116 in the periphery display region 112. Sizes of the pixels 116 in the main display region 110 are bigger than sizes of the pixels 116 in the periphery display region 112. Namely, size of each pixel 116 in the periphery display region 112 is smaller than size of each pixel 116 in the main display region 110. For example, in one case, lengths of the pixels 116 in the periphery display region 112 are smaller than lengths of the pixels 116 in the main display region 110, or widths of the pixels 116 in the periphery display region 112 are smaller than widths of the pixels 116 in the main display region 110. It is understood that a width of the pixel 116 is a width of the pixel 116 along a X direction, a length of a pixel 116 is a length of the pixel 116 along a Y direction, and the X direction is perpendicular to the Y direction.

In one embodiment, lengths of the pixels 116 in the periphery display region 112a located at left and right sides of the main display region 110 are equal to lengths of the pixels 116 in the main display region 110, and widths of the pixels 116 in the periphery display region 112a are smaller than widths of the pixels 116 in the main display region 110. Meanwhile, widths of the pixels 116 in the periphery display region 112a located at left and right sides of the main display region 110 are equal.

Furthermore, widths of the pixels 116 in the periphery display region 112b located at top and bottom sides of the main display region 110 are equal to widths of the pixels 116 in the main display region 110, and lengths of the pixels 116 in the periphery display region 112b are smaller than lengths of the pixels 116 in the main display region 110. Meanwhile, lengths of the pixels 116 in the periphery display region 112b located at top and bottom sides of the main display region 110 are equal.

About the pixels 116 in the periphery display region 112c located at four corners of the display panel 11, lengths of the pixels 116 in the periphery display region 112c are smaller than lengths of the pixels 116 in the main display region 110, and widths of the pixels 116 in the periphery display region 112c are smaller than widths of the pixels 116 in the main display region 110. More particularly, lengths of the pixels 116 in the periphery display region 112c are equal to lengths of the pixels 116 in the periphery display region 112b located at top and bottom sides of the main display region 110, and widths of the pixels 116 in the periphery display region 112c are equal to widths of the pixels 116 in the periphery display region 112a located at left and right sides of the main display region 110.

Figure 3:
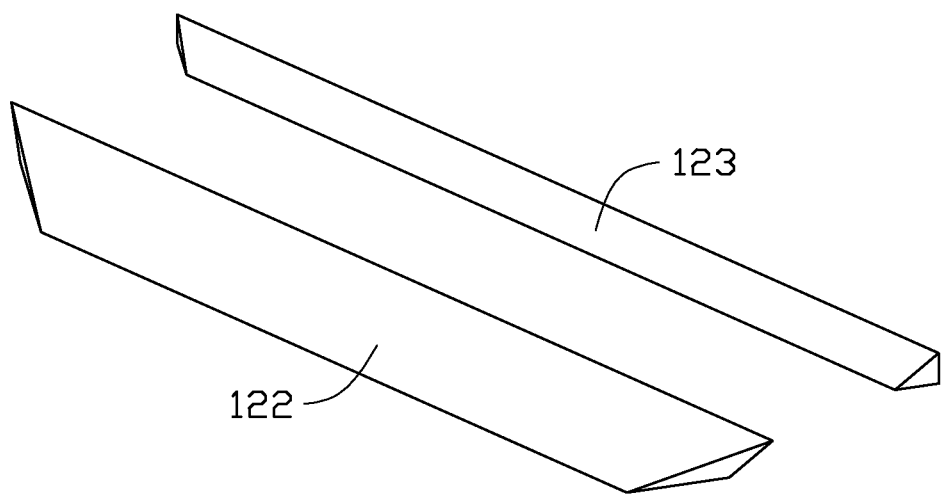
FIG. 3 is an isometric view of a compensating portion and a support portion of the present disclosure.

The image compensation element 12 includes compensation portion 122 and support portion 123. In this embodiment, there are four compensation portions 122 and support portions 123. The four compensation portions 122 and four support portions 123 are connected end to end to form a rectangular frame. FIG. 3 is an isometric view of a compensating portion and a support portion of the present disclosure. The compensating portion 122 is disposed on the periphery display region 112 to enlarge and distribute an image of the periphery display region 112 to the periphery display region 112 and the outside of the periphery display region 112 away from the main display region 110. The support portion 123 is disposed on the non-display region 114 connecting with the compensating portion 122 to support the compensating portion 122.

Figure 4:
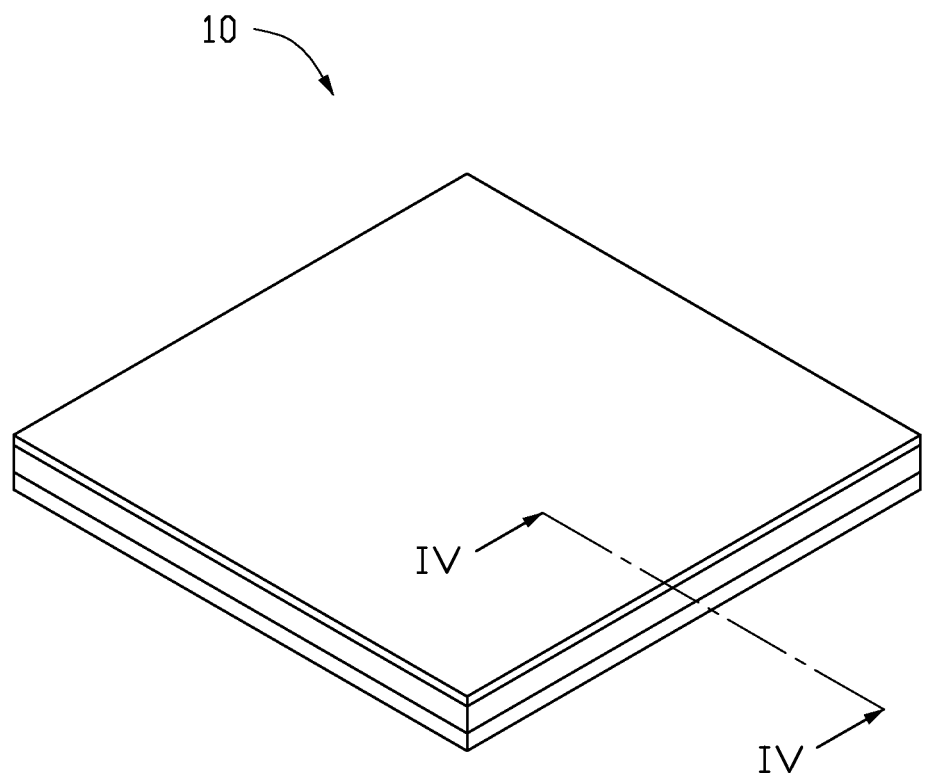
FIG. 4 is an isometric view of a touch control display device of the present disclosure after assembly.
Figure 5:
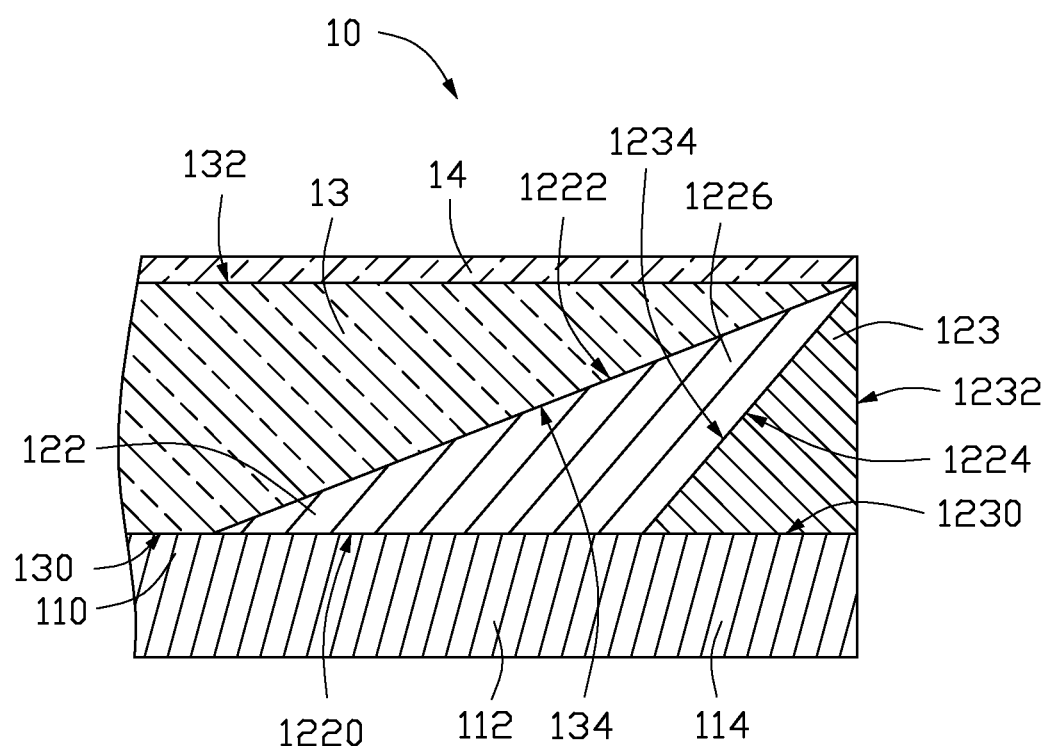
FIG. 5 is a cross-sectional view of a touch control display device along line IV-IV of FIG. 4.

FIG. 4 is an isometric view of a touch control display device 10 of the present disclosure after assembly. FIG. 5 is a cross-sectional view along line IV-IV of FIG. 4. The compensating portion 122 with a cross section shaped as an obtuse triangle includes a first light incident surface 1220, a first light emitting surface 1222, and an inclined surface 1224 connecting the first light incident surface 1220 and the first light emitting surface 1222. The first light incident surface 1220 is disposed corresponding to the periphery display region 112. The first light emitting surface 1222 and the first light incident surface 1220 are intersected with each other, with an acute angle formed therebetween. The inclined surface 1224 is disposed at one side of the compensating portion 122 away from the main display region 110. An angle formed between the inclined surface 1224 and the first light incident surface 1220 is an obtuse angle, such as 135 degrees. The compensating portion 122 includes a plurality of light guiding channels 1226 individually extending from the first light incident surface 1220 to the first light emitting surface 1222. A projection of the first light emitting surface 1222 on the first light incident surface 1220 is greater than an area of the light incident surface 1220, such that lights from the first light incident surface 1220 is transmitted and expanded to the first light emitting surface 1222 by the plurality of light guiding channels 1226. Therefore, an image of the periphery display region 112 is enlarged and distributed. In this embodiment, a projection of the first light emitting surface 1222 on the first light incident surface 1220 covers the periphery display region 112 and the non-display region 114. Thus, an image of the periphery display region 112 is enlarged and distributed by the compensation portion 122 not only above the periphery display region 112 but also above the non-display region 114. In this embodiment, extending directions of the plurality of light guiding channels 1226 are substantially parallel to the inclined surface 1224.

Figure 6:
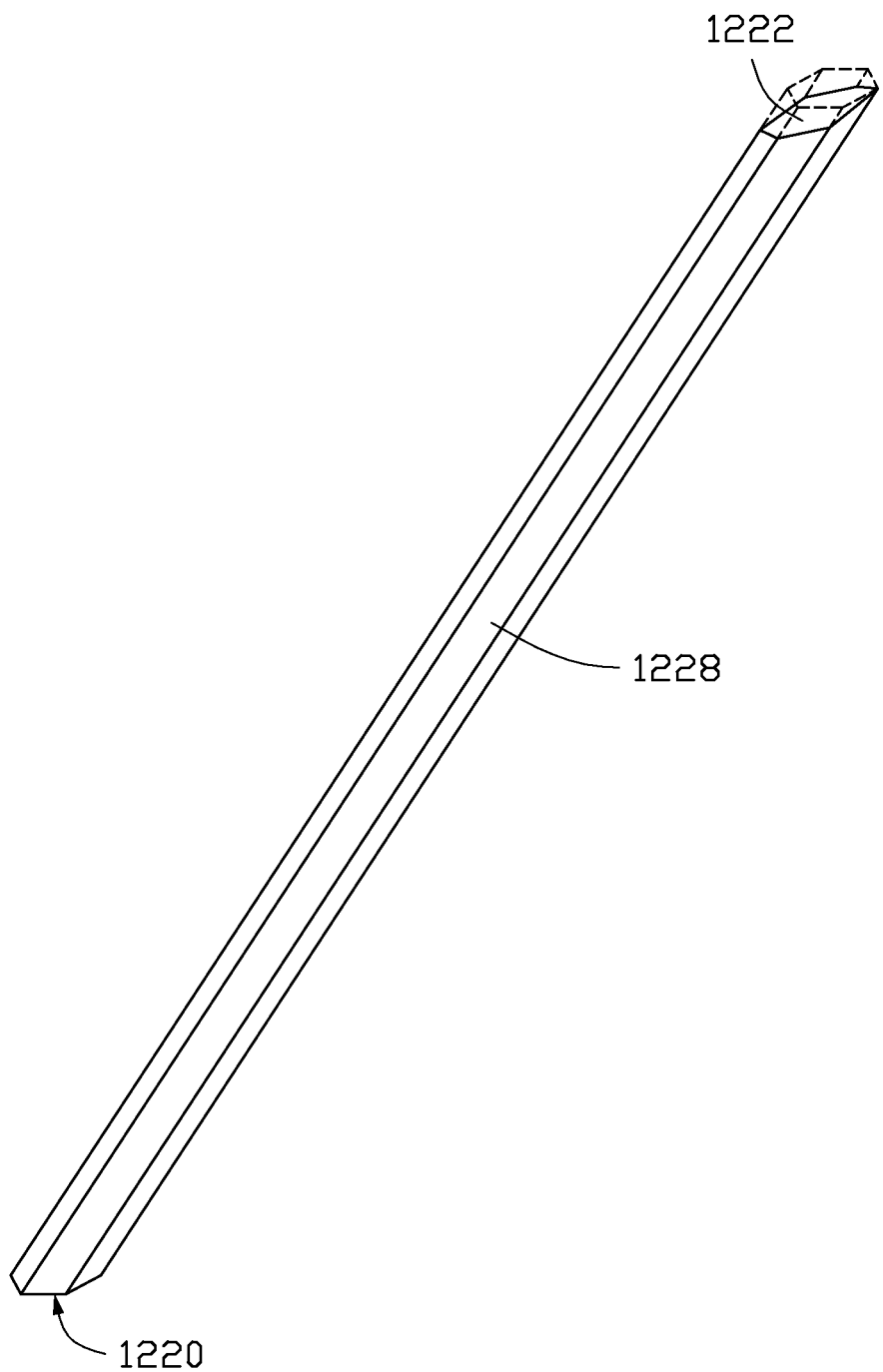
FIG. 6 is an isometric view of light guiding fibers of light guiding channels of the present disclosure.

In this embodiment, light guiding channels 1226 are constructed by light guiding fibers 1228. FIG. 6 is an isometric view of light guiding fibers 1228 of light guiding channels 1226 of the present disclosure. Each light guiding fiber 1228 extends from the first light incident surface 1220 to the first light emitting surface 1222. A section area of each light guiding fiber 1228 keeps constant along the direction from the first light incident surface 1220 to the first light emitting surface 1222 (a diameter of the light guiding fiber 1228 is constant). An amplifying ratio of the light guiding fiber 1228 is mainly determined by an inclining degree of the first light emitting surface 1222. A projection of the light guiding fiber 1228 on the first light emitting surface 1222 is greater than a projection of the light guiding fiber 1228 on the first light incident surface 1220, such that an image from the pixels 116 in the periphery display region 112 is enlarged and expanded by the light guiding fibers 1228. The light guiding channels 1226 may be combined with a number of fibers, light guiding thin plates, silica fibers, glass fibers, or the other light penetrating material.

A cross-section of the support portion 123 is a right triangle. The support portion 123 has a bottom surface 1230 corresponding to the non-display region 114, a first side surface 1232 perpendicular to the bottom surface 1230, and a second side surface 1234 connecting the bottom surface 1230 and the first side surface 1232. The second side surface 1234 is overlapped with the inclined surface 1224 of the compensation portion 122. More specifically, the second side surface 1234 is combined to the inclined surface 1224 of the compensation portion 122 by adhering, glue or other connecting agent. The support portion 123 may be made of transparent material such as glass or transparent resin or non-transparent material such as metal or plastic.

The transmission element 13 comprises a second light incident surface 130, a second light emitting surface 132 parallel to the second light incident surface 130, and a first engaging surface 134 connecting the second light incident surface 130 and the second light emitting surface 132. An area of the second light emitting surface 132 is greater than an area of the second light incident surface 130. Thus, the first engaging surface 134 is disposed inclined. The second light incident surface 130 is disposed above the main display region 110. The first engaging surface 134 is overlapped with the first light emitting surface 1222 of the compensation portion 122. The touch sensing structure 14 is disposed adjacent to the second light emitting surface 132 of the transmission element 13, such as disposed on the second light emitting surface 132. More specifically, the first engaging surface 134 is combined to the first light emitting surface 1222 by adhering, glue or other connecting agent. The transmission element 13 may be made of transparent material such as glass or transparent resin.

Figure 7:
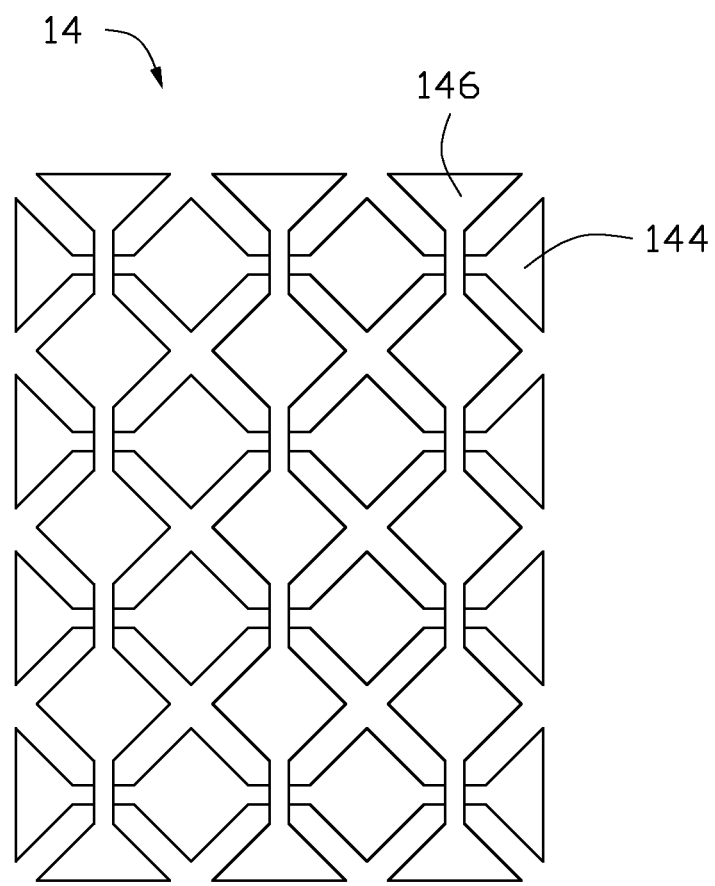
FIG. 7 is a diagrammatic view of a touch sensing structure of the touch control display device of FIG. 1.

The touch sensing structure 14 may be a capacitive touch panel. FIG. 7 is a diagrammatic view of a touch sensing structure of the touch control display device 10 of FIG. 1. The touch sensing structure 14 comprises a plurality of first conducting wiring 144 extending along a X direction and a plurality of second conducting wiring 146 extending along a Y direction. The first conducting wiring 144 and the second conducting wiring 146 are isolated and intercrossed, defining a plurality of sensing capacitances to sense touch actions applied thereon.

In this embodiment, heights of the transmission element 13, support portion 123, and the compensation portion 122 above the display panel 11 are substantially the same. The first light incident surface 1220 of the compensation portion 122, the second light incident surface 130 of the transmission element 13, and the bottom surface 1230 of the support portion 123 are in the same plane. A sum area of the transmission element 13, the support portion 123, and the compensation portion 122 is substantially equal to an area of the display panel 11, with a rectangular shaped, covering a cover lens on the display panel 11. More specifically, the image compensation element 12 is combined to the display panel 11 by adhering, such as glue.

An image of the periphery display region 112 is distributed and expanded to the outside of the periphery display region 112 away from the main display region 110, thus, the image of the periphery display region 112 is enlarged, and an image displayed by the touch control display device 10 is larger than a sum of the main display region 110 and the periphery display region 112. Furthermore, arrangement of the pixels 116 in the periphery display region 112 is in higher density, and space taken by the pixels 116 in the periphery display region 112 is less. An image shown by the pixels 116 in the periphery display region 112 is distributed and expanded to the outside of the periphery display region 112 away from the main display region 110 through the compensation portion 122. Thus, the image of the periphery display region 112 is enlarged, and an image displayed by the touch control display device 10 is larger than a sum of the main display region 110 and the periphery display region 112.

The compensation portion 122 expands the image of periphery display region 112 to the non-display region 114, thus, an image displayed by the touch control display device 10 is larger than a sum of the main display region 110 and the periphery display region 112. Furthermore, the non-display region 114 is invisible to a viewer, thus, the touch control display device 10 has a frame-less displaying effect.

Figure 8:
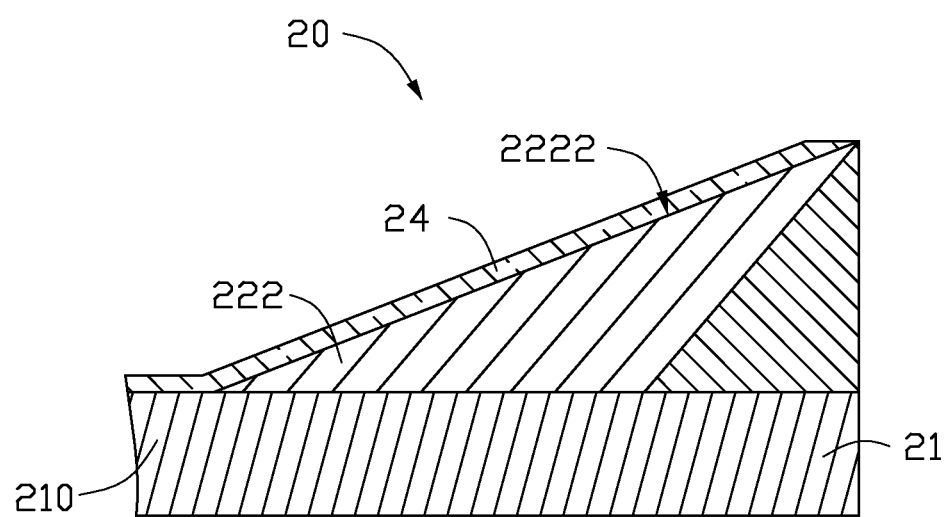
FIG. 8 is a cross-sectional view of a second embodiment of a touch control display device of the present disclosure.

FIG. 8 is a cross-sectional view of a second embodiment of a touch control display device 20 of the present disclosure. The touch control display device 20 is similar to the touch control display device 10 of the first embodiment but the transmission element is omitted, and a touch sensing structure 24 covers a main display region 210 of a display panel 21 and a first light emitting surface 2222 of a compensation portion 222.

Figure 9:
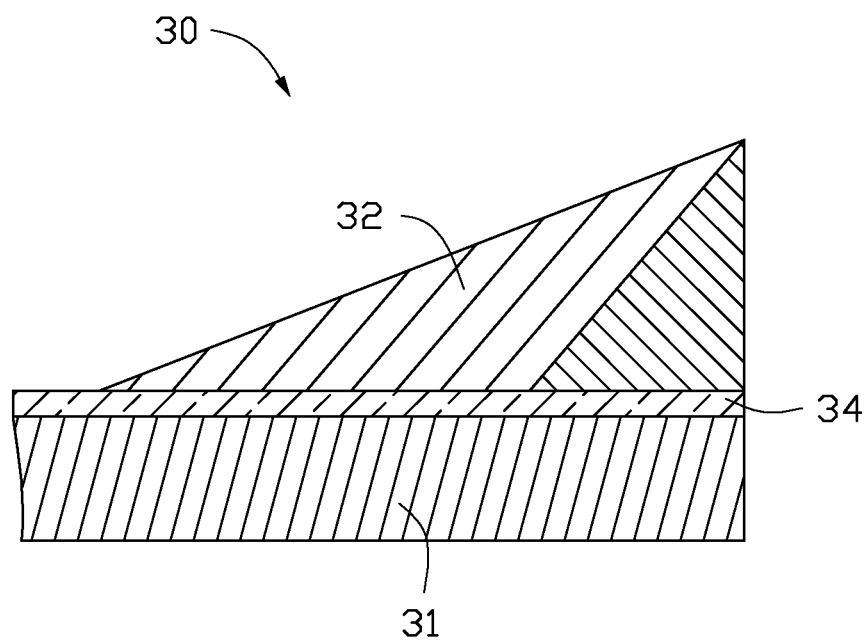
FIG. 9 is a cross-sectional view of a third embodiment of a touch control display device of the present disclosure.

FIG. 9 is a cross-sectional view of a third embodiment of a touch control display device 30 of the present disclosure. The touch control display device 30 is similar to the touch control display device 10 of the first embodiment but a touch sensing structure 34 is disposed on a display panel 31 adjacent to an image compensation element 32, and the touch sensing structure 34 is sandwiched between the display panel 31 and the image compensation element 32.

Figure 10:
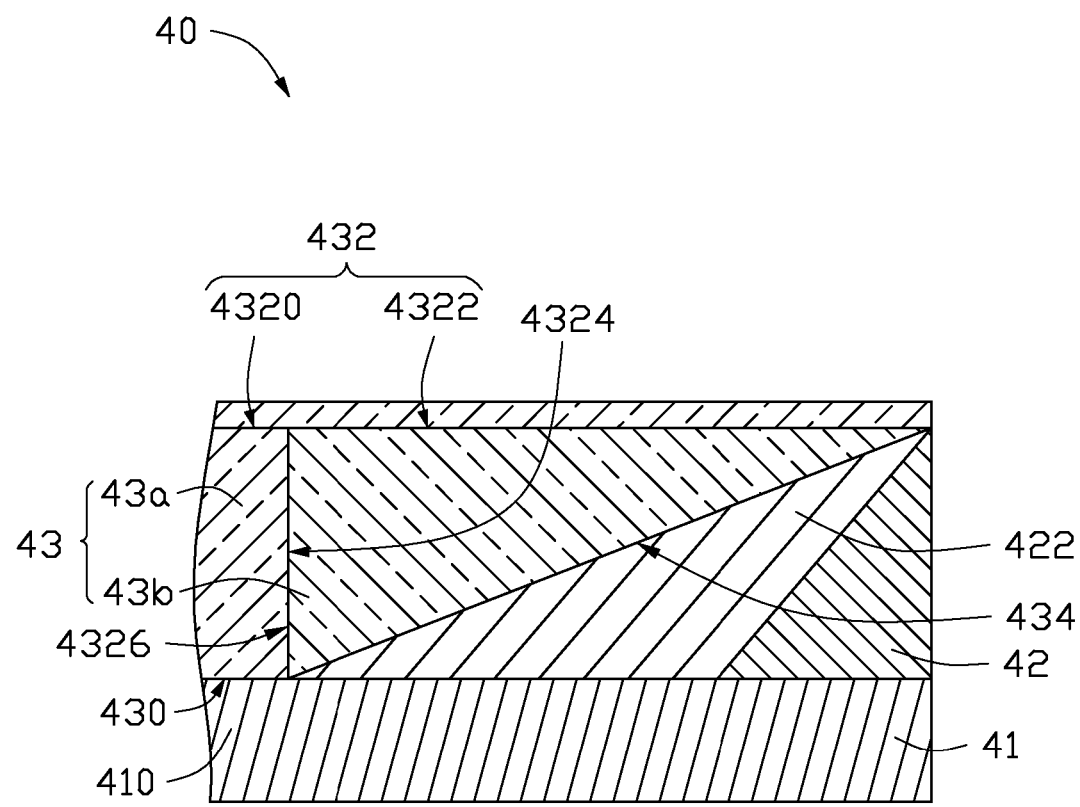
FIG. 10 is a cross-sectional view of a fourth embodiment of a touch control display device of the present disclosure.

FIG. 10 is a cross-sectional view of a fourth embodiment of a touch control display device 40 of the present disclosure. The touch control display device 40 is similar to the touch control display device 10 of the first embodiment but a structure of a transmission element 43 of the touch control display device 40 is different from the structure of the transmission element 13 of the first embodiment. The transmission element 43 comprises a main portion 43a and an edge portion 43b disposed adjacent to the main portion 43a. A second light emitting surface 432 comprises a main region 4320 corresponding to a main display region 410 and a periphery region 4322 near the main region 4320. The main portion 43a comprises a bottom surface, a top surface parallel to the bottom surface, and a connecting surface 4324 perpendicularly connecting the bottom surface and the top surface. The bottom surface of the main portion 43a is defined as a second light incident surface 430 corresponding to the main display region 410. The top surface of the main portion 43a is defined as a part of the second light emitting surface 432 corresponding to the main region 4320. A cross-section of the edge portion 43b is a triangle. The edge portion 43b comprises a first engaging surface 434 connecting with a compensation portion 422, parts of the second light emitting surface 432 corresponding to the periphery region 4322, and second engaging surface 4326 corresponding to the connecting surface 4324 of the main portion 43a. The second engaging surface 4326 of the edge portion 43b is overlapped to the connecting surface 4324 of the main portion 43a. More specifically, the second engaging surface 4326 is combined to the connecting surface 4324 by adhering, glue or other connecting agent.

Figure 11:
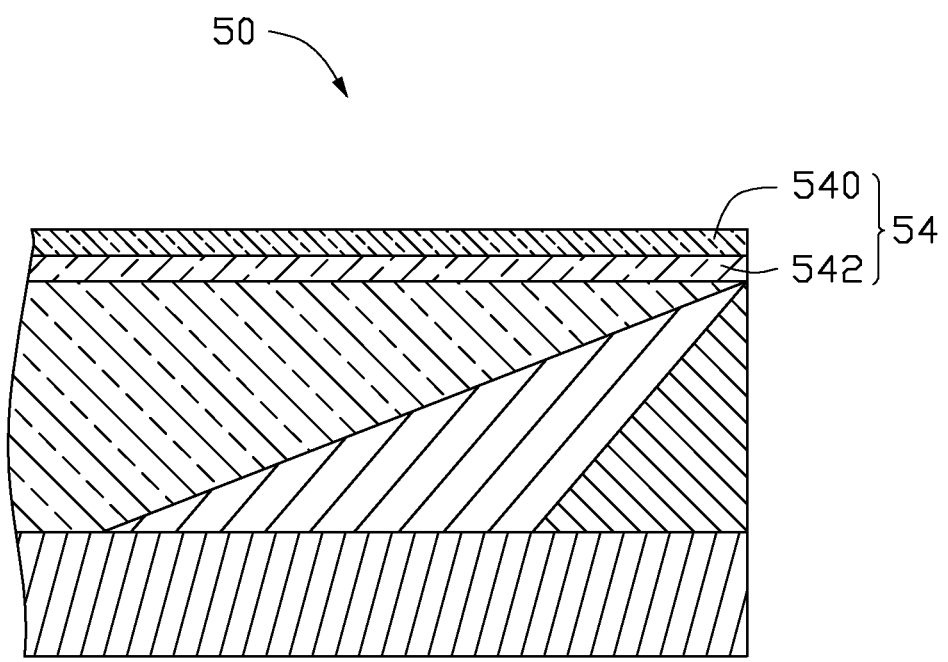
FIG. 11 is a cross-sectional view of a fifth embodiment of a touch control display device of the present disclosure.
Figure 12:
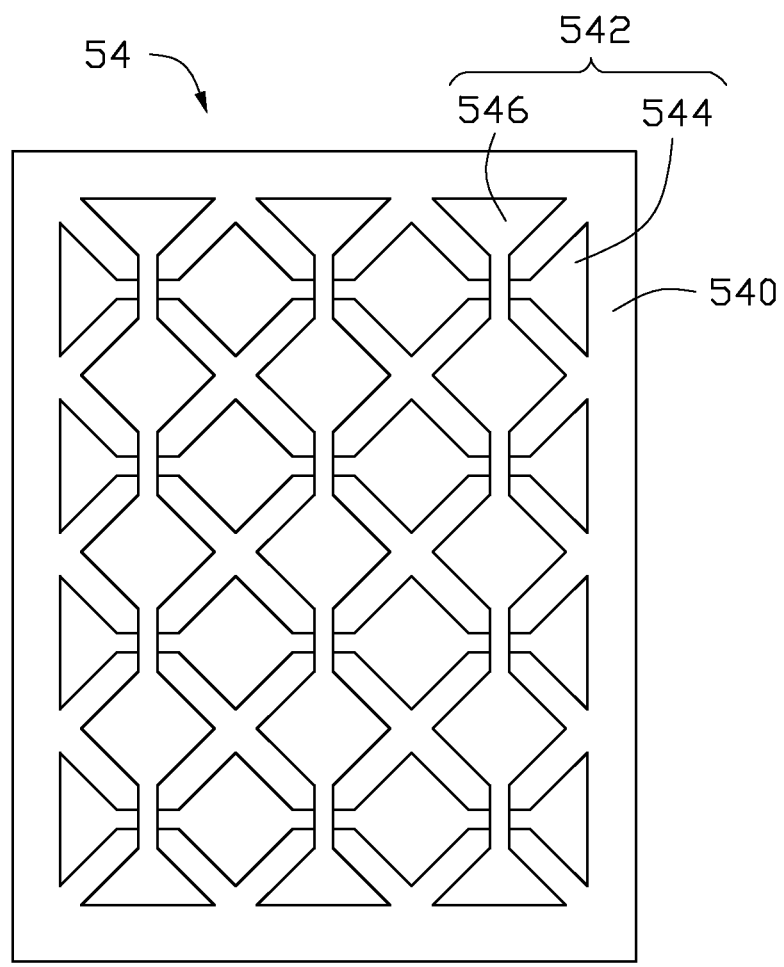
FIG. 12 is a diagrammatic view of a touch sensing structure of the touch control display device of FIG. 11.

FIG. 11 is a cross-sectional view of a fifth embodiment of a touch control display device 50 of the present disclosure. FIG. 12 is a diagrammatic view of a touch sensing structure of the touch control display device of FIG. 11. The touch control display device 50 is similar to the touch control display device 10 of the first embodiment but a structure of a touch sensing structure 54 of the touch control display device 50 is different from the structure of the touch sensing structure 14 of the first embodiment. The touch sensing structure 54 comprises a base plate 540 and a touch sensing layer 542. The touch sensing layer 542 is disposed on base plate 540 near the display panel. The touch sensing structure 54 comprises a plurality of first conducting wiring 544 extending along a X direction and a plurality of second conducting wiring 546 extending along a Y direction. The first conducting wiring 544 and the second conducting wiring 546 are isolated and intercrossed, defining a plurality of sensing capacitances to sense touch actions applied thereon.

Figure 13:
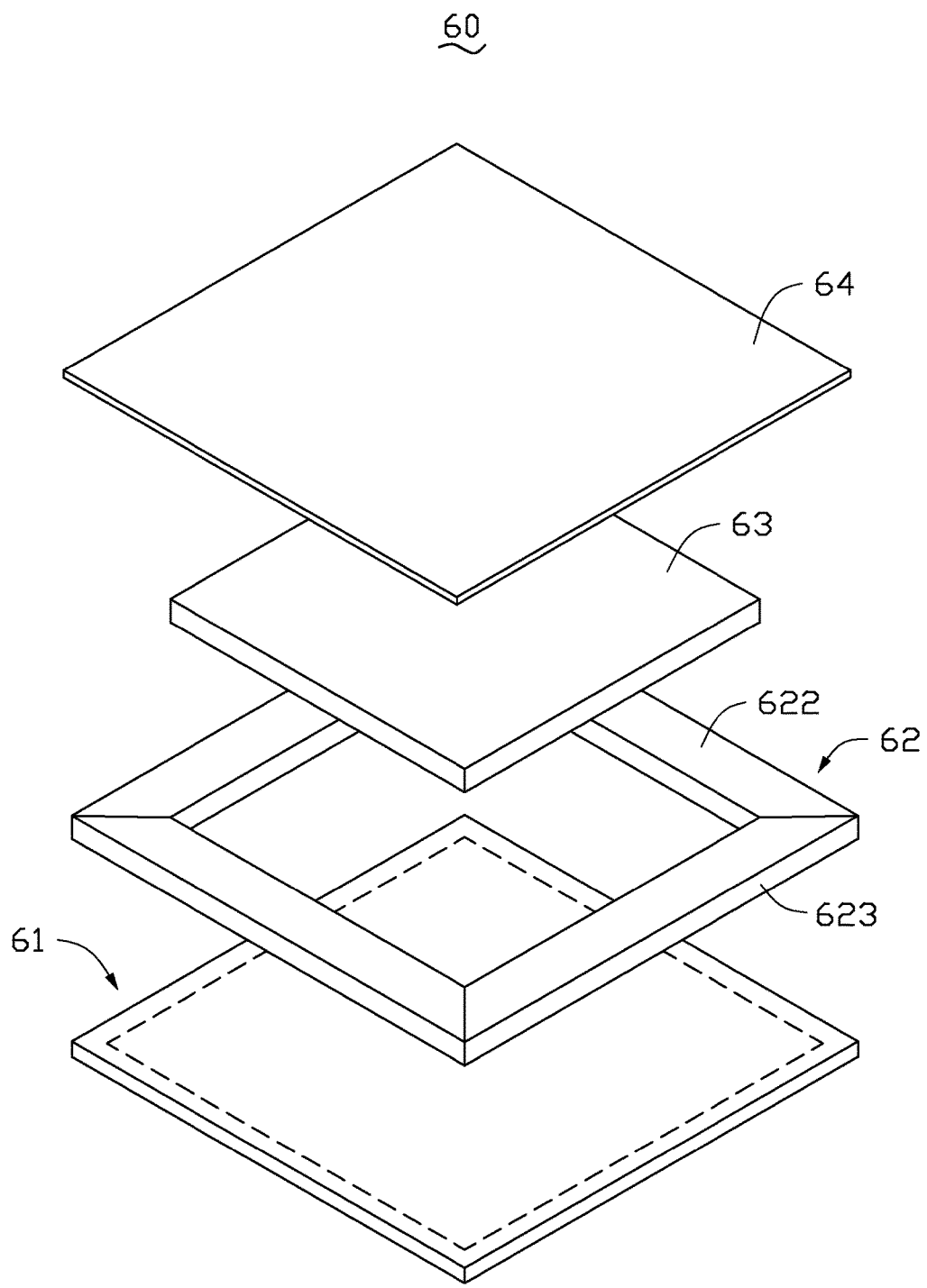
FIG. 13 is an isometric view of a sixth embodiment of a touch control display device of the present disclosure.
Figure 14:
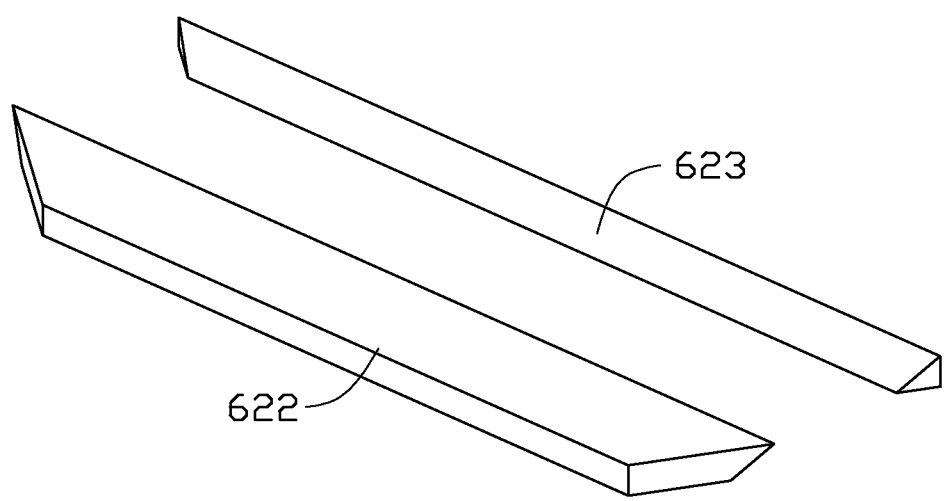
FIG. 14 is an isometric view of the compensation portion and the support portion of FIG. 13.
Figure 15:
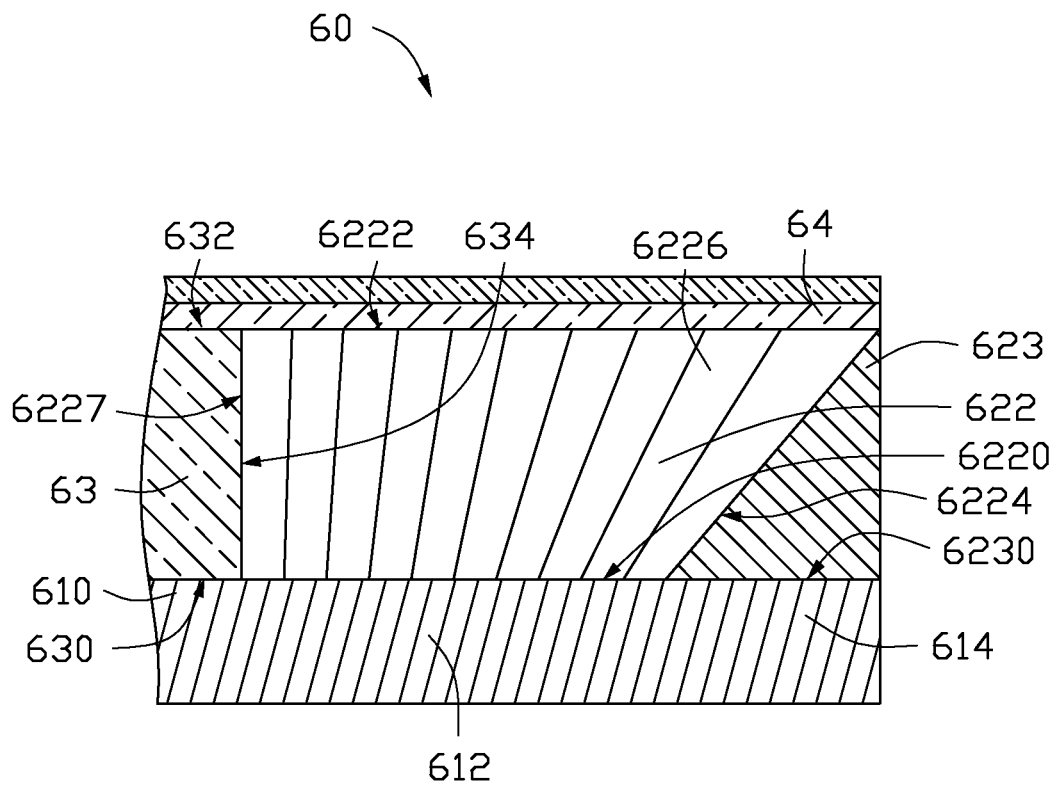
FIG. 15 is a cross-sectional view of the touch control display device of FIG. 13.

FIG. 13 is an isometric view of a sixth embodiment of a touch control display device of the present disclosure. FIG. 14 is an isometric view of the compensation portion and the support portion of FIG. 13. FIG. 15 is a cross-sectional view of the touch control display device 60 of FIG. 13. The touch control display device 60 is similar to the touch control display device 10 of the first embodiment but a structure of a transmission element 63 and a compensation portion 622 of the touch control display device 60 is different from the structure of the transmission element 13 and a compensation portion 122 of the first embodiment. A cross-section of the compensation portion 622 is an isosceles trapezoid. The compensation portion 622 comprises a first light incident surface 6220 corresponding to a main display region 610, a first light emitting surface 6222 parallel to the first light incident surface 6220, a inclined surface 6224 contacting with a support portion 623 and connecting the first light incident surface 6220 and the first light emitting surface 6222, and a connecting surface 6227 which is disposed opposite to the inclined surface 6224 and connects the first light incident surface 6220 and the first light emitting surface 6222. The transmission element 63 comprises a second light incident surface 630, a second light emitting surface 632, and a first engaging surface 634 perpendicularly connecting the second light emitting surface 632 and the second light incident surface 630. The second light incident surface 630 of the transmission element 63 is disposed corresponding to the main display region 610. The second light emitting surface 632 of the transmission element 63 and the first light emitting surface 6222 of the compensation portion 622 are in the same plane, forming a display plane of the touch control display device 60. The first engaging surface 634 of the transmission element 63 is combined to the connecting surface 6227 of the compensation portion 622 by adhering, glue or other connecting agent to overlap with each other. The second light incident surface 630 of the transmission element 63, the first light incident surface 6220 of the compensation portion 622, and a bottom surface 6230 of the support portion 623 are in the same plane, and corresponds to the main display region 610, a periphery display region 612, and a non-display region 614 of a display panel 61, respectively.

Figure 16:
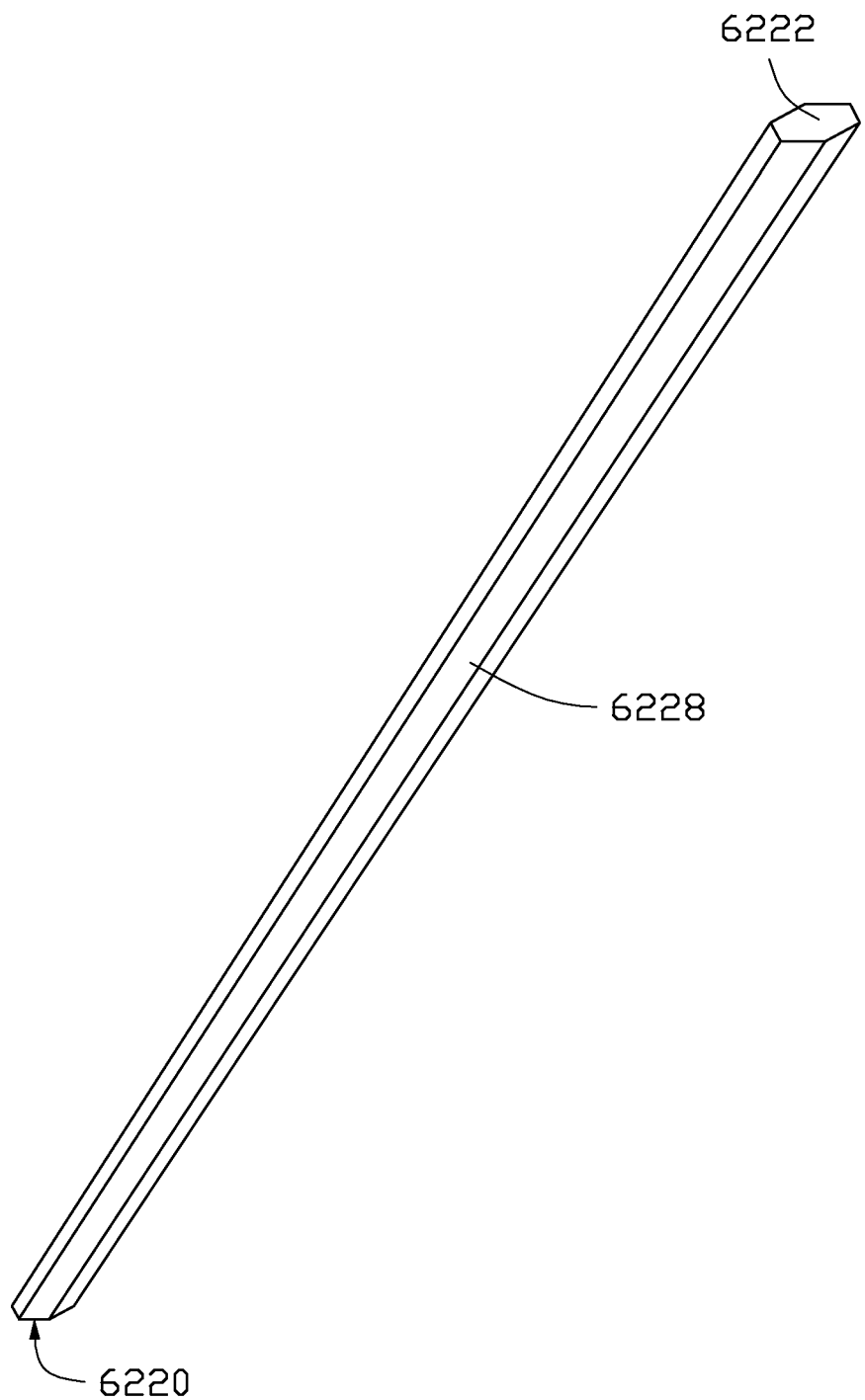
FIG. 16 is an isometric view of a light guiding channel constructed by a light guiding fiber of the present disclosure.

Furthermore, in the touch control display device 60, a section area of a light guiding channel 6226 of the compensation portion 622 increases along the direction from the first light incident surface 6220 to the first light emitting surface 6222. FIG. 16 is an isometric view of a light guiding channel 6226 constructed by a light guiding fiber 6228 of the present disclosure. A section area of each light guiding fiber 6228 increases along the direction from the first light incident surface 6220 to the first light emitting surface 6222 (a diameter of each optical guiding fiber 6228 increases along the direction from the first light incident surface 6220 to the first light emitting surface 6222), and an area of the light guiding fiber 6228 on the first light emitting surface 6222 is greater than an area of the light guiding fiber 6228 on the first light incident surface 6220. Thus, images of the periphery display region 612 is enlarged and amplified by the light guiding fibers 6228. It is understood that an amplifying ratio of the images is determined by increased diameter of the light guiding fibers.

Figure 17:
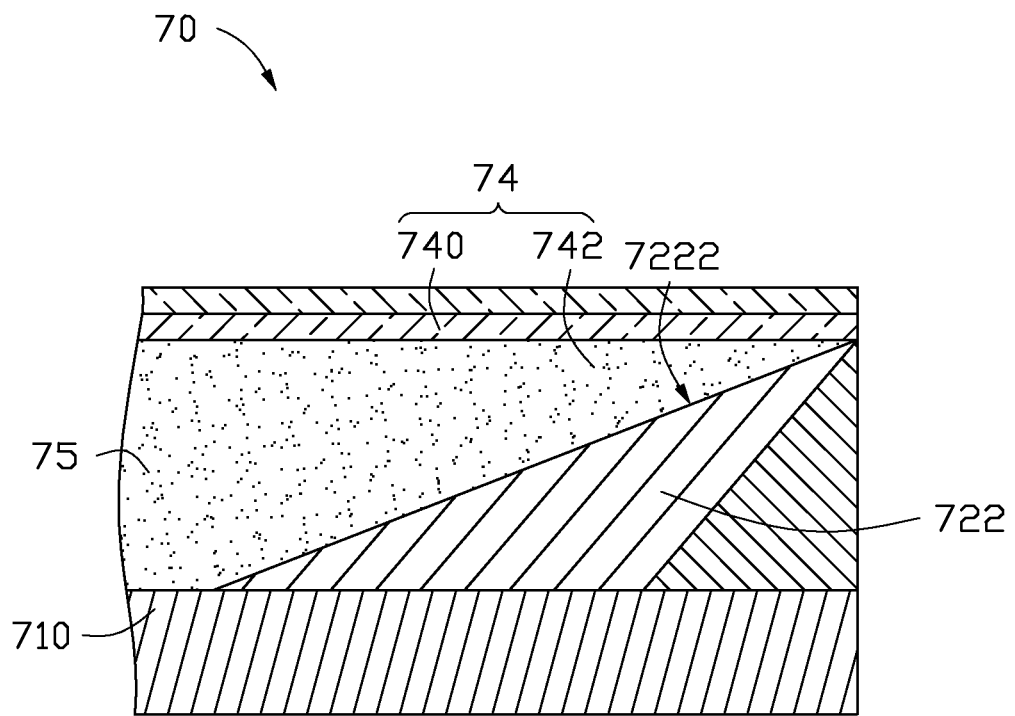
FIG. 17 is a cross-sectional view of a seventh embodiment of a touch control display device of the present disclosure.

FIG. 17 is a cross-sectional view of a seventh embodiment of a touch control display device 70 of the present disclosure. The touch control display device 70 is similar to the touch control display device 10 of the first embodiment but a structure of a touch sensing structure 74 of the touch control display device 70 is different from the structure of the touch sensing structure 14 of the first embodiment. The touch sensing structure 74 comprises a base plate 740 and a touch sensing layer 742 disposed on the base plate 740. A space surrounding by a first light emitting surface 7222 of a compensation portion 722 and a main display region 710 is filled with glue 75. The touch sensing structure 74 is disposed on the glue 75 away from the main display region 710, and covers the compensation portion 722. It is understood that the touch sensing layer 742 may comprise the first conducting wiring and the second conducting wiring shown in FIG. 12.

Figure 18:
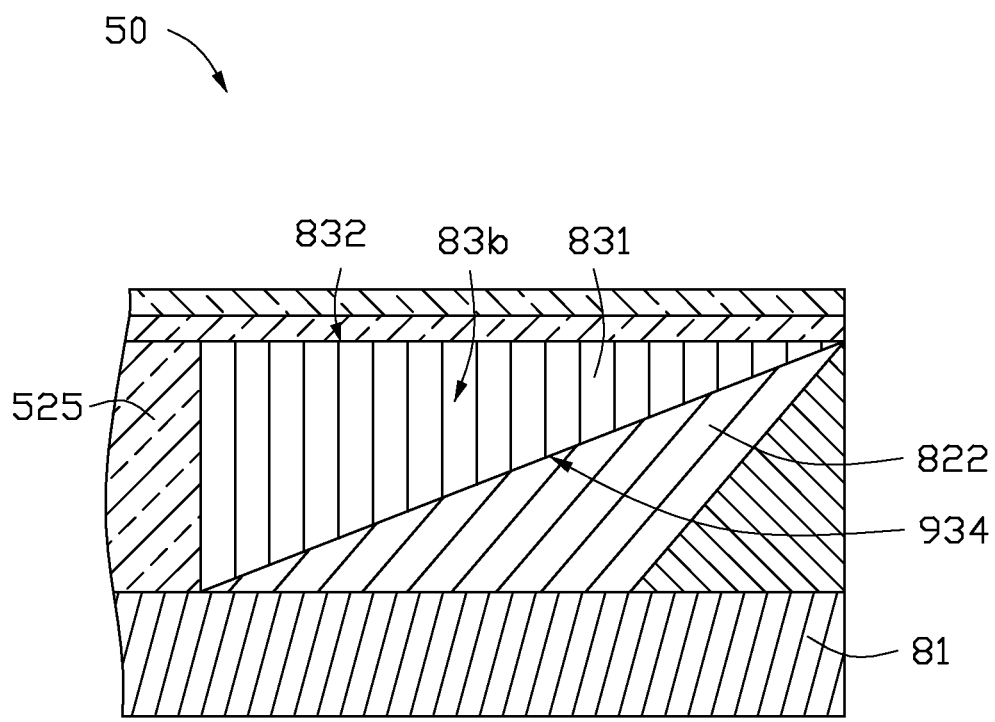
FIG. 18 is a cross-sectional view of an eighth embodiment of a touch control display device 80 of the present disclosure.

FIG. 18 is a cross-sectional view of an eighth embodiment of a touch control display device 80 of the present disclosure. The touch control display device 80 is similar to the touch control display device 40 of the fourth embodiment but an edge portion 83b may comprise a plurality of light guiding channels 831 independent from each other. The light guiding channels 831 extend from an engaging surface 934 to parts of a second light emitting surface 832 of a periphery region. More specifically, in this embodiment, an extending direction of the light guiding channels 831 is perpendicular to the second light emitting surface 832 and a display panel 81.

Figure 19:
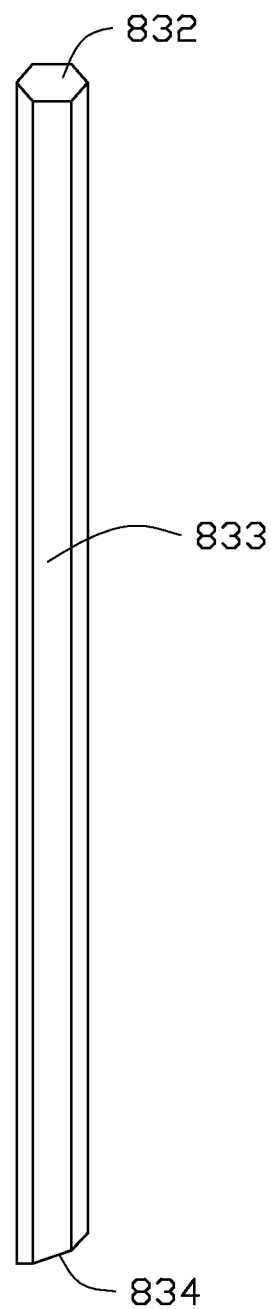
FIG. 19 is a diagrammatic view of a light guiding channel constructed by a light guiding fiber of the present disclosure.

Similar to the light guiding channels of a compensation portion 822, the light guiding channels 831 may be light guiding fibers 833. FIG. 19 is a diagrammatic view of a light guiding channel constructed by a light guiding fiber of the present disclosure. A section area of each light guiding fiber 833 keeps constant (a diameter of the light guiding fiber 833 is constant). The light guiding channels 831 may be combined with a number of fibers, light guiding thin plates, silica fibers, glass fibers, or the other light penetrating material.

In this embodiment, lights from fibers of the compensation portion 822 is transmitted to the second light emitting surface 832 parallel to the display panel 81 by the light guiding channels 831 of the edge portion 83b. The edge portion 83b has a number of light guiding channels 831 independent from each other, light emitted from the edge portion 83b will not be disordered and scattered, which makes image amplified by the compensation portion 822 to the second light emitting surface 832 has a relatively high definition. Thus, the touch control display device 80 has a relatively high definition.

Figure 20:
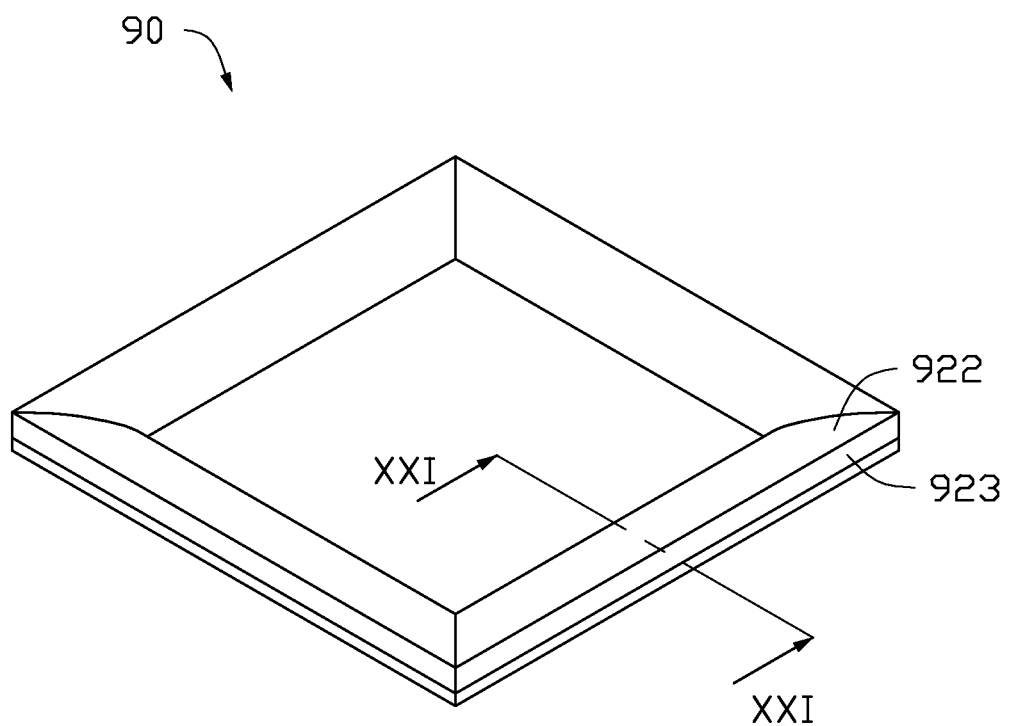
FIG. 20 is an isometric view of a ninth embodiment of a touch control display device of the present disclosure.
Figure 21:
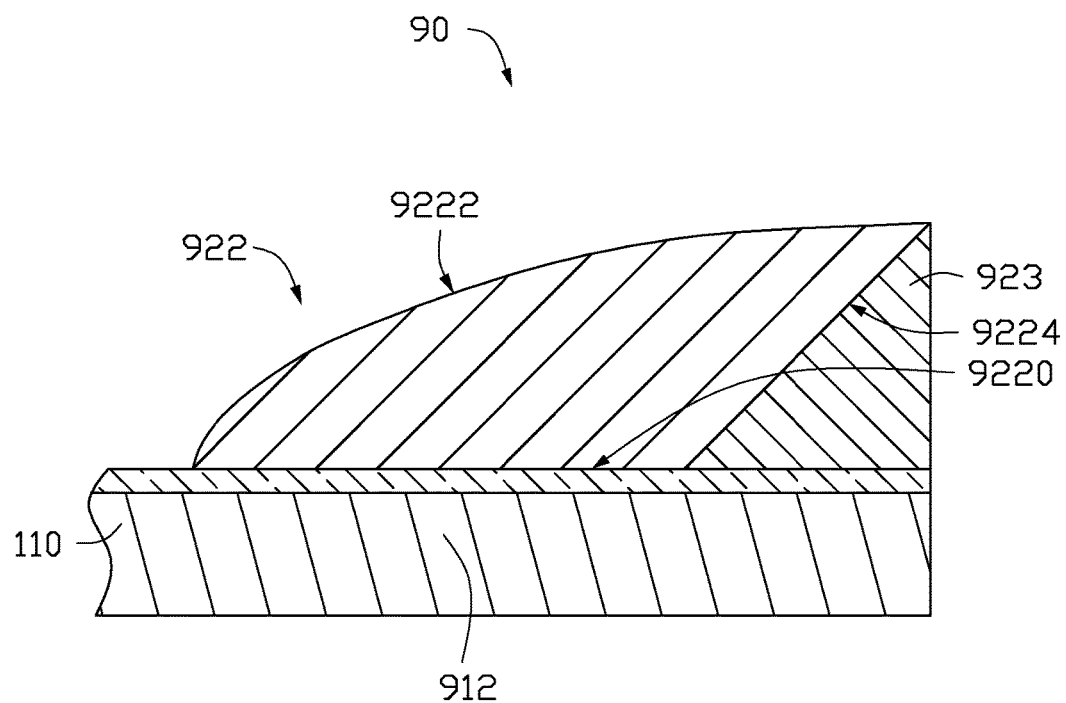
FIG. 21 is a cross-sectional view of a ninth embodiment of a touch control display device along line XXI-XXI of FIG. 20.

FIG. 20 is an isometric view of a ninth embodiment of a touch control display device 90 of the present disclosure. FIG. 21 is a cross-sectional view along line XXI-XXI of FIG. 20. The touch control display device 90 is similar to the touch control display device 30 of the third embodiment but a structure of a compensation portion 922 of the touch control display device 90 is different from the structure of the compensation portion of the third embodiment. More specifically, a cross-section of the compensation portion 922 is a circular sector. The compensation portion 922 comprises a first light incident surface 9220 corresponding to a periphery display region 912, a first light emitting surface 9222 with an arc-shaped surface, and an inclined surface 9224 contacting with a support portion 923 and connecting the first light incident surface 9220 and the first light emitting surface 9222. A cross-section of the first light emitting surface 9222 is arc-shaped.

Figure 22:
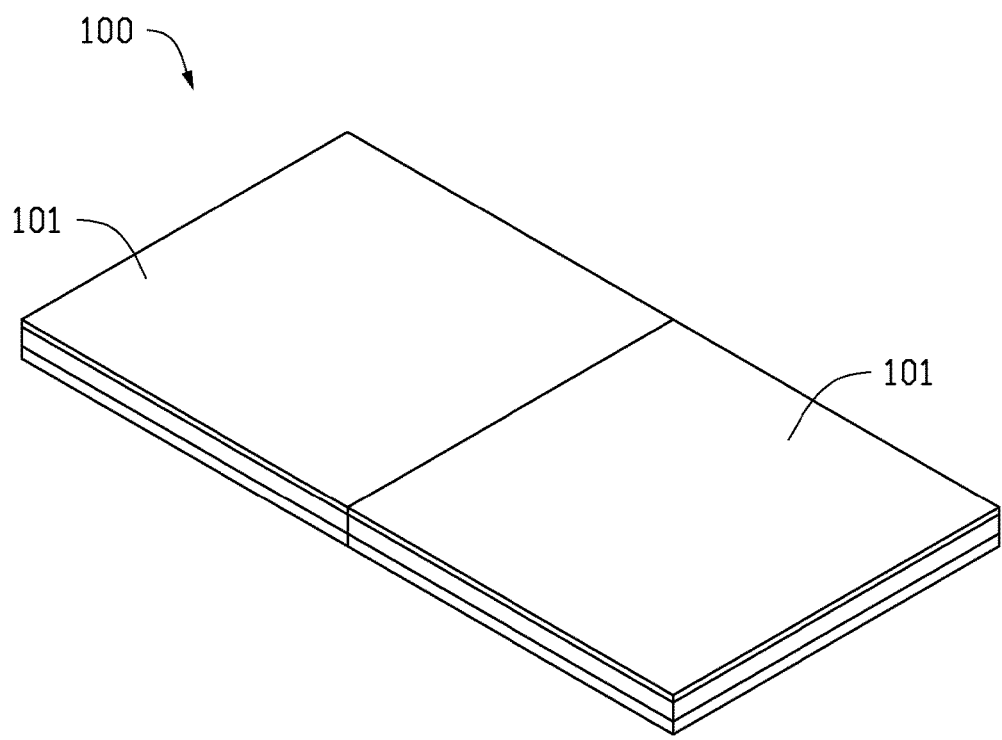
FIG. 22 is an isometric view of a first embodiment of a joint touch control display of the present disclosure.

FIG. 22 is an isometric view of a first embodiment of a joint touch control display 100 of the present disclosure. The joint touch control display 100 includes two touch control display device 101 parallel arranged and jointed together. The touch control display device 101 may employ one of the touch control display device 10,40-80 of the first, the fourth, the fifth, the sixth, the seventh, and the eighth embodiment mentioned above.

Figure 23:
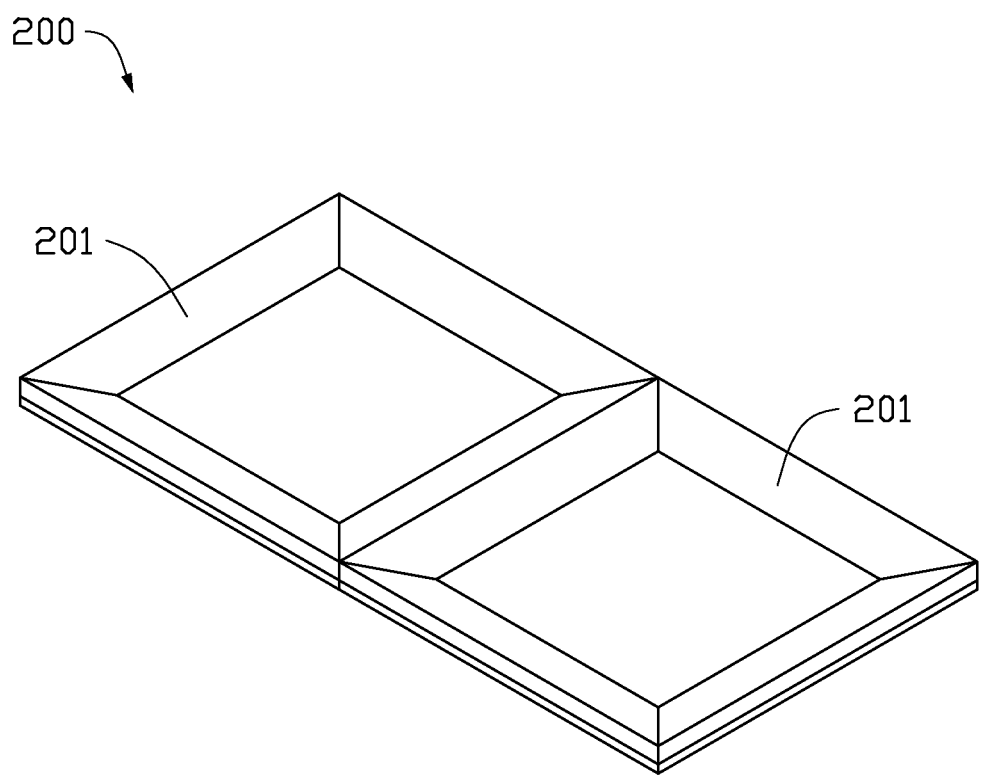
FIG. 23 is an isometric view of a second embodiment of a joint touch control display of the present disclosure.

FIG. 23 is an isometric view of a second embodiment of a joint touch control display 200 of the present disclosure. The joint touch control display 200 includes two touch control display device 201 parallel arranged and jointed together. The touch control display device 201 may employ one of the touch control display device 20,30 of the second and third embodiment mentioned above.

Figure 24:
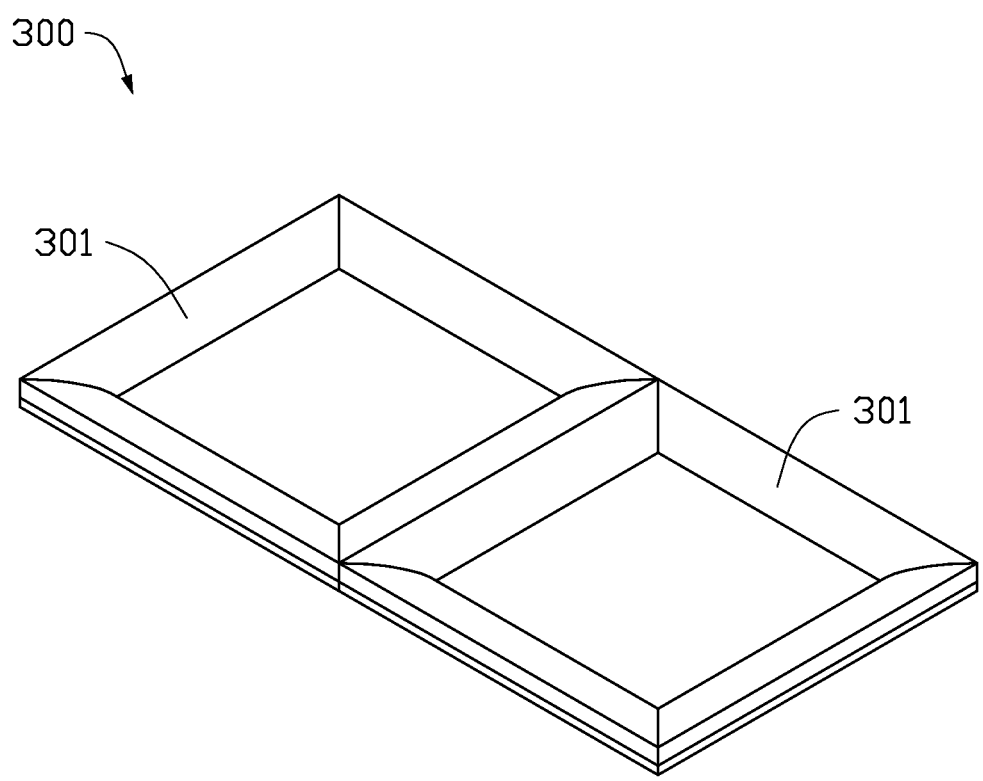
FIG. 24 is an isometric view of a third embodiment of a joint touch control display of the present disclosure.

FIG. 24 is an isometric view of a third embodiment of a joint touch control display 300 of the present disclosure. The joint touch control display 300 includes two touch control display device 301 parallel arranged and jointed together. The touch control display device 301 may employ the touch control display device 90 of the ninth embodiment mentioned above.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A touch control display device, comprising:
   a display panel comprising a main display portion and a periphery display portion;
   an image compensation element disposed on the display panel and comprising a compensation portion which is configured to distribute an image of the periphery display portion to the outside of the periphery display portion away from the main display portion; and
   a touch sensing structure configured to sense touch actions applied to the touch control display device;
   wherein the compensation portion comprises a first light incident surface, a first light emitting surface, and a plurality of light guiding channels individually extending from the first light incident surface to the first light emitting surface, an area of the first light emitting surface is greater than an area of the first light incident surface, and lights from the first light incident surface being transmitted and expanded to the first light emitting surface by the plurality of light guiding channels; a sectional area of the plurality of light guiding channels increases along a direction from the first light incident surface to the first light emitting surface; and wherein the first light incident surface is disposed corresponding to the periphery display region, and the first light emitting surface is parallel to the first light incident surface.

2. The touch control display device of claim 1, further comprising a transmission element including a bottom surface, a top surface, and an engaging surface connecting between the top surface and the bottom surface, wherein the bottom surface is disposed corresponding to the main display region, a display plane of the touch control display device is formed by the top surface of the transmission element and the first light emitting surface of the compensation portion, the compensation portion further comprises a connecting surface connecting between the first light incident surface and the first light emitting surface, and the connecting surface of the compensation portion and the engaging surface of the transmission element are overlapped.

3. The touch control display device of claim 2, wherein the touch sensing structure is disposed on the top surface of the transmission element and the first light emitting surface of the compensation portion.

* * * * *